US009389441B2

(12) United States Patent
Coult et al.

(10) Patent No.: US 9,389,441 B2
(45) Date of Patent: Jul. 12, 2016

(54) INTERCONNECT BRIDGE ASSEMBLY FOR PHOTONIC INTEGRATED CIRCUITS

(71) Applicant: Infinera Corp., Annapolis Junction, MD (US)

(72) Inventors: David Gerald Coult, Oley, PA (US); Radhakrishnan L. Nagarajan, Cupertino, CA (US); Jiaming Zhang, Macungie, PA (US); Joseph Edward Riska, Macungie, PA (US); Donald J. Pavinski, Jr., West Pittston, PA (US); Jie Tang, Fogelsville, PA (US); Timothy Butrie, Hellertown, PA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 13/855,552

(22) Filed: Apr. 2, 2013

(65) Prior Publication Data

US 2015/0180580 A1    Jun. 25, 2015

Related U.S. Application Data

(60) Provisional application No. 61/726,559, filed on Nov. 14, 2012.

(51) Int. Cl.
| | |
|---|---|
| *H04B 10/00* | (2013.01) |
| *H04B 10/04* | (2006.01) |
| *H04B 10/06* | (2006.01) |
| *G02F 1/03* | (2006.01) |

(52) U.S. Cl.
CPC .................... *G02F 1/0327* (2013.01)

(58) Field of Classification Search
USPC .................. 398/164, 180, 201, 214
See application file for complete search history.

(56) References Cited

U.S. PATENT DOCUMENTS

| 5,444,564 | A * | 8/1995 | Newberg | H03H 7/40 333/17.3 |
|---|---|---|---|---|
| 6,313,659 | B1 * | 11/2001 | Bosnyak | H03K 19/0005 326/30 |
| 6,567,203 | B1 * | 5/2003 | Hill | G02F 1/2255 359/237 |
| 2003/0227666 | A1 * | 12/2003 | Bridges | G02F 1/2255 359/321 |
| 2004/0067006 | A1 * | 4/2004 | Welch | B82Y 20/00 385/14 |
| 2004/0101006 | A1 * | 5/2004 | Iwafuji | H01S 5/02252 372/36 |
| 2004/0262614 | A1 * | 12/2004 | Hack | G09G 3/3258 257/79 |
| 2006/0145341 | A1 * | 7/2006 | Jiang | H01L 23/66 257/734 |

(Continued)

*Primary Examiner* — David Payne
*Assistant Examiner* — Pranesh Barua
(74) *Attorney, Agent, or Firm* — Dunlap Codding PC; David L. Soltz

(57) ABSTRACT

A photonic transmitter, comprises a modulator driver having a first and second output ports, a photonic integrated transmitter circuit having a modulator having a first and a second input line, and a first input port electrically coupled with the first input line and a second input port electrically coupled with the second input line, and an interconnect bridge assembly, including a first termination resistor, a second termination resistor, and a substrate. An impedance-controlled transmission structure is formed in the substrate, and has: (a) an impedance control section including a first and a second signal lines electrically insulated from one another; and (b) a transmission section including a third and a fourth signal line coupled with termination resistor. The interconnect bridge assembly transmits an impedance controlled differential electrical signal from the modulator driver to the modulator, and transmits the electrical signal from the modulator to the first and second termination resistors.

16 Claims, 9 Drawing Sheets

(56) References Cited

U.S. PATENT DOCUMENTS

| | | | |
|---|---|---|---|
| 2008/0031626 A1* | 2/2008 | Welch | G02B 6/12004 398/79 |
| 2008/0032446 A1* | 2/2008 | Wood | H01L 23/367 438/106 |
| 2008/0044128 A1* | 2/2008 | Kish | G02B 6/12004 385/14 |
| 2009/0022500 A1* | 1/2009 | Pinguet | G02B 6/1228 398/164 |
| 2009/0129786 A1* | 5/2009 | Deane | H05K 1/0274 398/164 |
| 2009/0245801 A1* | 10/2009 | Little | G02B 6/12004 398/89 |
| 2009/0297088 A1* | 12/2009 | Koh | G02F 1/0121 385/2 |
| 2010/0322631 A1* | 12/2010 | Nagarajan | G02B 6/12004 398/65 |
| 2011/0007486 A1* | 1/2011 | Pavinski | H01L 23/49833 361/760 |
| 2011/0204507 A1* | 8/2011 | Pavinski, Jr. | H01L 23/04 257/692 |
| 2013/0235544 A1* | 9/2013 | Tucker | H01L 23/49833 361/783 |

* cited by examiner

INTERCONNECT BRIDGE ASSEMBLY FOR PHOTONIC INTEGRATED CIRCUITS

INCORPORATION BY REFERENCE

The entirety of U.S. provisional patent application Ser. No. 61/726,559, filed on Nov. 14, 2012, is hereby expressly incorporated herein by reference.

BACKGROUND

1. Field of Inventive Concepts

The inventive concepts disclosed herein are generally directed to interconnect bridge assemblies used to connect photonic integrated circuit chips and electronic integrated circuit chips. More particularly, but not by way of limitation, the inventive concepts disclosed herein are directed to a high-speed flip-chip interconnect bridge assembly to connect a modulator implemented as a transmitter photonic integrated circuit and a modulator driver supplying electronic signals to the modulator within a wave-division multiplexing optical network. In some exemplary embodiments, the interconnect bridge assembly can also be used to interconnect an optical signal detector implemented as a receiver photonic integrated circuit and a receiver amplifier.

2. Brief Description of Prior Art

Wavelength Division Multiplexing (WDM) optical networks are deployed for transporting data in long haul networks, metropolitan area networks, and other optical communication applications. In a WDM optical network, a plurality of different light wavelengths, representing signal channels, are transported or propagated along optical fiber links or along one more optical fibers comprising an optical span.

In a conventional WDM system, an optical transmitter is an electrical-to-optical (EO) conversion apparatus for generating an integral number of optical channels $\lambda_1$, $\lambda_2$, $\lambda_n$, where each channel has a different center or peak wavelength.

DWDM optical networks, commonly have optical transmitter modules that deploy eight or more optical channels, with some DWDM optical networks employing 30, 40, 80 or more signal channels. In the past, the optical transmitter module generally had a plurality of discrete optical devices, such as a discrete group or array of laser sources of different wavelengths, a plurality of discrete modulators, such as, Mach-Zehnder modulators (MZMs) or electro-absorption modulators (EAMs), and an optical combiner, such as a star coupler, a multi-mode interference (MMI) combiner, an Echelle grating or an arrayed waveguide grating (AWG). All of these optical components were optically coupled to one another as an array of optical signal paths coupled to the input of an optical combiner using a multitude of single mode fibers (SMFs), each aligned and optically coupled between discrete optical devices.

The recent development of photonic integrated circuit chips has increased the efficiency of DWDM networks by incorporating multiple previously separate optical components onto a single integrated photonic circuit chip (PIC). PICs have significantly increased the throughput of optical networks and have decreased the size and cost of optical network nodes and components. For an example of a PIC that may be used in a DWDM network see U.S. Pat. No. 8,300,994.

In the case of DWDM networks, modulator driver chips or modulator drivers supply high-frequency electrical signals indicative of data to one or more modulators on the PIC, and the modulators convert the high-frequency electrical signals into optical signals by modulating the light signal outputted by a laser source for each channel or wavelength used by the DWDM network. Modulator drivers are typically separate electronic integrated circuits, such as ASICS, for example, which have multiple output ports (e.g., one for each electrical channel), which are electrically connected with multiple input ports on the PIC to transmit the high-frequency electrical signals (e.g., radio-frequency signals) to the modulators on the PIC. Currently, the connections between modulator drivers and PICs are established by positioning the modulator driver in close proximity to the PIC and connecting multiple pairs of output ports on the modulator driver and input ports on the PIC with a plurality of conductive wire bonds between each pair of output ports and input ports.

However, due to the large number of electrical channels and the very high frequencies employed in modern DWDM optical networks, the use of multiple conductive wire bonds is approaching its practical limits. Such limits for example may arise from the space requirements for multiple connective wire bonds, cross-talk or interference between adjacent wire bonds due to their close proximity to one another and the very high-frequency of the electric signals, impedance-mismatch induced signal deterioration due to reflections of the high-frequency signals carried by the wire bonds.

To that end, what is needed is a device and method to more efficiently interconnect modulator drivers and modulators incorporated into PICs of optical networks and optical signal detectors and receiver amplifiers, while at the same time minimizing impedance mismatch and heat buildup in the PICs. It is to such interconnect bridge assemblies between a modulator driver and a PIC and/or a PIC and a receiver amplifier that the inventive concepts disclosed herein are directed.

SUMMARY

In one aspect, the inventive concepts disclosed herein are directed to a photonic transmitter, comprising: a modulator driver having a first output port and a second output port; a photonic integrated transmitter circuit having at least one modulator having a first input line and a second input line, a first input port electrically coupled with the first input line and a second input port electrically coupled with the second input line and an interconnect bridge assembly. The interconnect bridge assembly includes a first termination resistor, a second termination resistor, and a substrate. At least one impedance-controlled transmission structure is formed in the substrate, the at least one impedance-controlled transmission structure having: (a) an impedance control section including a first signal line electrically coupled with the first output port of the modulator driver and with the first input port of the photonic integrated transmitter circuit, and a second signal line electrically coupled with the second output port of the modulator driver and with the second input port of the photonic integrated transmitter circuit, the first and second signal lines being electrically insulated from one another; and (b) a transmission section including a third signal line electrically coupled with the first input line of the at least one modulator and with the first termination resistor, and a fourth signal line electrically coupled with the second input line of the at least one modulator and with the second termination resistor. The interconnect bridge assembly is configured to transmit an impedance-matched differential electrical signal from the modulator driver to the modulator, and to transmit the differential electrical signal from the at least one modulator to the first and second termination resistors.

In some exemplary embodiments, the first and second termination resistors may be thin-film resistors associated with the modulator driver and may be thermally coupled with a heat sink. The first and second termination resistors may be discrete resistors associated with the modulator driver. The photonic integrated transmitter circuit may be thermally coupled with a heat sink. The substrate may be substantially flexible. The impedance control section may include an active impedance-matching circuit. In some embodiments, the interconnect bridge assembly may be electrically coupled with the first and second output ports of the modulator driver and with the first and second input ports of the photonic integrated transmitter circuit by being flip-chip bonded thereto via at least four flip-chip bumps. The impedance control section may be a passive impedance-matching circuit, and/or the first and second signal lines may be stepped transmission lines.

In a further aspect, the inventive concepts disclosed herein are directed to a photonic receiver, comprising: (1) a photonic integrated receiver circuit having at least one optical signal detector having a first output line and a second output line, and a first output port electrically coupled with the first output line and a second output port electrically coupled with the second output line, (2) a receiver amplifier having a first input port and a second input port; and (3) an interconnect bridge assembly. The interconnect bridge assembly may include a substrate, with at least one impedance-controlled transmission structure formed in the substrate and including a first signal line electrically coupled with the first input port of the receiver amplifier and with the first output port of the photonic integrated receiver circuit, and a second signal line electrically coupled with the second input port of the receiver amplifier and with the second output port of the photonic integrated receiver circuit, the first and second signal lines being electrically insulated from one another. The interconnect bridge assembly may be configured to transmit an impedance-matched differential electrical signal from the at least one optical signal detector to the receiver amplifier. The photonic integrated receiver circuit may be thermally coupled with a heat sink. The substrate may be substantially flexible. The interconnect bridge assembly may be electrically coupled with the first and second output ports of the photonic integrated receiver circuit and with the first and second input ports of the receiver amplifier by being flip-chip bonded thereto via at least four flip-chip bumps. The first signal line and the second signal line may be implemented as stepped transmission lines. The impedance-controlled transmission structure may include an active impedance-matching circuit.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION OF EXEMPLARY EMBODIMENTS

Figure 1:
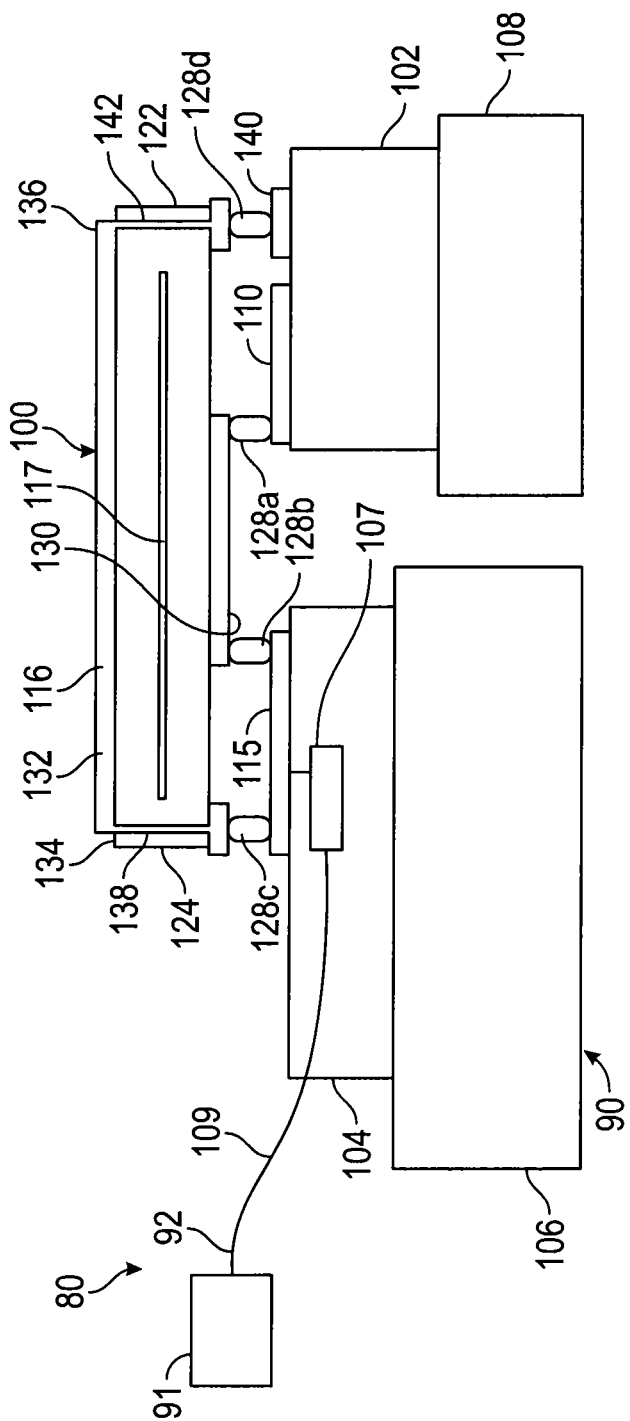
FIG. 1 is a diagram of an exemplary embodiment of an interconnect bridge assembly according to the inventive concepts disclosed herein shown connected to a modulator implemented as a photonic integrated circuit and to a modulator driver which supplies electrical signals to the modulator via the interconnect bridge assembly.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are generally directed to a high-speed interconnect bridge assembly used to connect a modulator incorporated into a PIC and a modulator driver (e.g., an integrated electronic circuit or an ASIC) utilized in optical networks to provide one or more drive signals to the modulator incorporated into the PIC. The interconnect bridge assembly is configured to replace the wire bonds heretofore used to connect PICs and modulator drivers, and may be configured to carry very high-frequency electrical signal and/or to provide impedance control and/or thermal management for the PIC.

In some exemplary embodiments, the interconnect bridge assembly may be flip-chip connected with the PIC and with the modulator driver. The interconnect bridge assembly may be substantially flexible so that difference in the heights of the PIC and the modulator driver may be compensated for by flexing of the interconnect bridge assembly. In some exemplary embodiments, the interconnect bridge assembly may be configured to include one or more impedance-matched terminator resistors, which may be positioned on an end of the interconnect bridge assembly connected to the modulator driver, or on the modulator driver itself, so that heat generated by the resistors is dissipated away from the PIC so as to not interfere with the operation of the optical components of the PIC, or to reduce heat generation in the system. Interconnect bridge assemblies according to the inventive concepts disclosed herein may achieve the desired impedance matching with passive and/or active impedance matching circuitry, for example.

Figure 2:
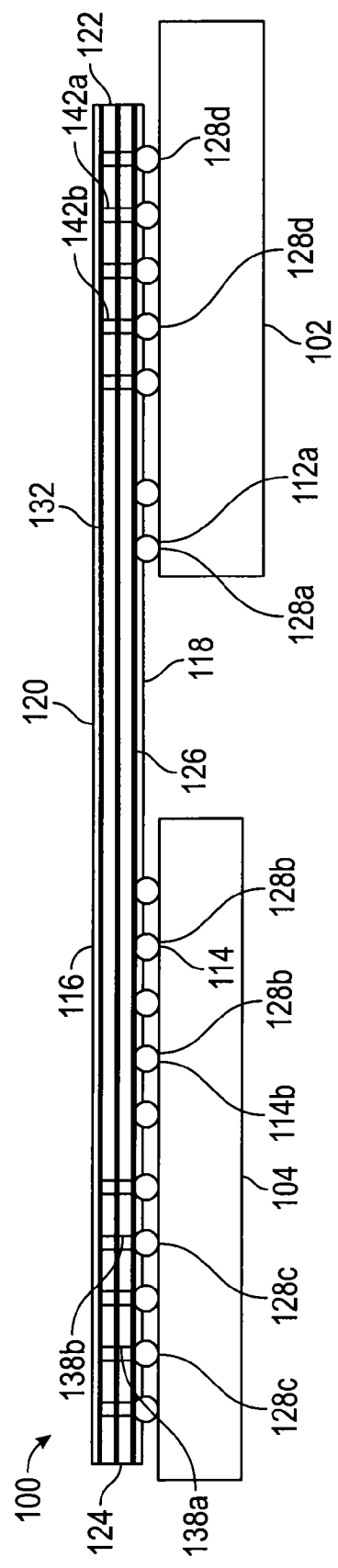
FIG. 2 is a side view diagram of the interconnect bridge assembly of FIG. 1.
Figure 3:
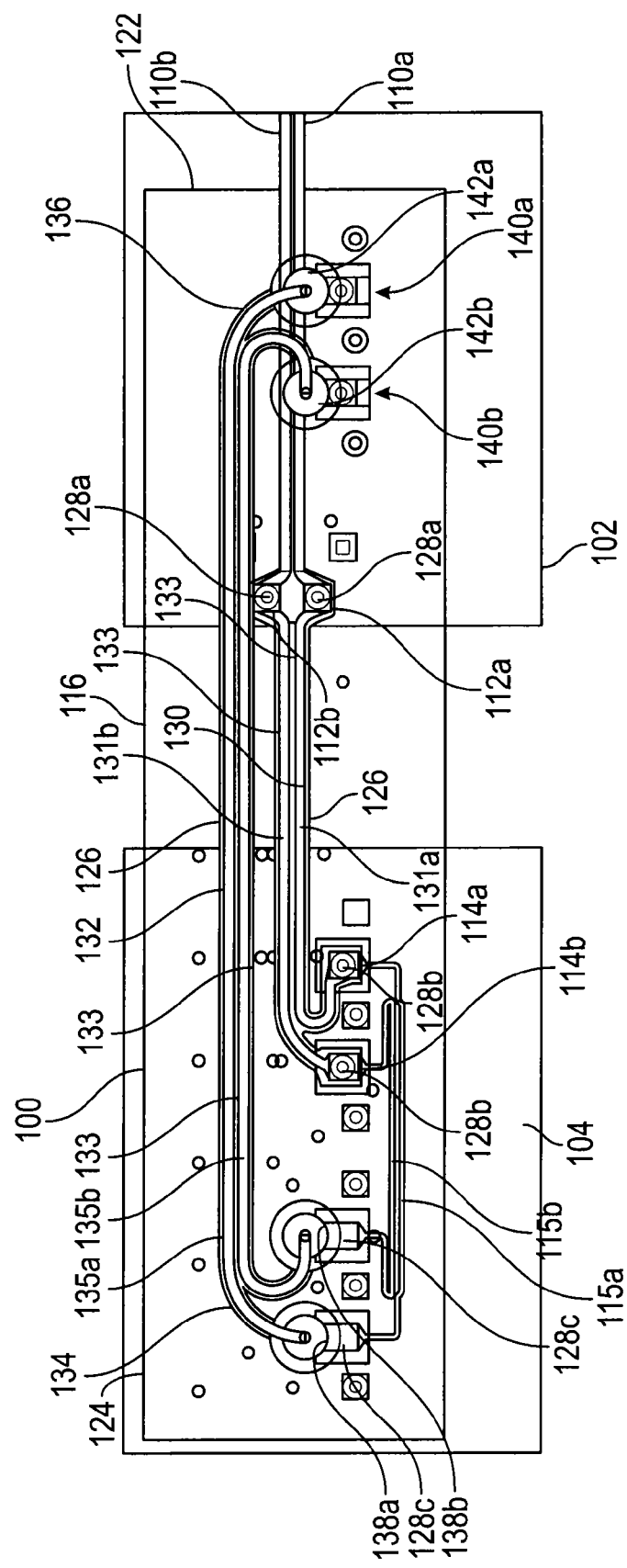
FIG. 3 is a top view of diagram of the interconnect bridge assembly of FIG. 1.

Referring now to the drawings, and to FIGS. 1-3 in particular, shown therein is an exemplary embodiment of a portion of a DWDM system 80 having a plurality of photonic transmitters 90 and photonic receivers 91 communicating optically by way of a fiber optic link 92. The photonic transmitter 90 supplies at least one channel onto the fiber optic link 92 using DWDM technology. The photonic transmitter 90 is provided with an interconnect bridge assembly 100 according to the inventive concepts disclosed herein connected to a modulator driver 102 and to a PIC 104. As discussed above, the photonic transmitter 90 may be a part of a DWDM optical network module (not shown) as will be appreciated by a person of ordinary skill in the art having the benefit of the instant disclosure.

The modulator driver 102 may be implemented as any desired integrated circuit device, such as a processor, a field-programmable gate array, an application specific integrated circuit, or combinations thereof, and may be configured to transmit one or more high-frequency electrical signals to the PIC 104. The modulator driver 102 may have a first impedance as will be appreciated by persons of ordinary skill in the art. In some exemplary embodiments, the modulator driver 102 may be implemented and may function similarly to the modulator driver 98 and/or 106A as described in U.S. Pat. No. 8,300,994 the entire disclosure of which is hereby expressly incorporated herein by reference. The modulator driver 102 may include signal transmission lines 110a and 110b (FIG. 3) coupled with output ports 112a and 112b, for example. The modulator driver 102 may be thermally coupled with a heat sink 108 (FIG. 1) configured to absorb and/or remove thermal energy from the modulator driver 102, as will be appreciated by persons of ordinary skill in the art. The heat sink 108 may be implemented as a thermoelectric cooler in some exemplary embodiments.

The electrical signals provided by the modulator driver 102 may be indicative of data to be encoded into an optical signal by the PIC 104, and may be very high-frequency differential electrical signals, such as radio frequency electrical signals (RF signals) in some exemplary embodiments, and may have frequencies up to 40 GHz or any other desired frequency, as will be appreciated by persons of ordinary skill in the art having the benefit of the instant disclosure.

The PIC 104 may be implemented as a photonic integrated circuit configured to convert one or more (such as 10, 20, 40, or more) electrical signals into a wave-division multiplexed optical signal and to transmit the optical signal into the optical fiber 109. The PIC 104 may include one or more optical signal source and modulator pairs 107 (FIG. 1), and one or more wave-division multiplexers (not shown) as described in U.S. Pat. No. 8,300,994. The optical signal source and modulator pair 107 may be implemented similarly to the modulator 14 as described in U.S. Pat. No. 8,300,994, for example, and may have a second impedance which may be different than the first impedance of the modulator driver 102. The wave-division multiplexer of the PIC 104 may be optically coupled with one or more optical fiber 109 via one or more optical interconnects (not shown), so as to output a wave division multiplexed optical signal along the optical fiber, for example. In some exemplary embodiments, the PIC 104 may be implemented and function similarly to the photonic circuit integrated circuit chips described in U.S. Pat. No. 8,300,994.

The PIC 104 may include input ports 114a and 114b, and may have at least two modulator lines 115a and 115b electrically coupled with the input ports 114a and 114b, and with at least one optical signal source and modulator pair 107, for example. The optical signal source and modulator pair 107 may be implemented as a laser and a Mach-Zehnder modulator pair, for example. It is to be understood that while the exemplary embodiment shown in FIGS. 1-3 includes a first input port 114a and a second input port 114b, and a first modulator line 115a and a second modulator line 115b, exemplary embodiments of the inventive concepts disclosed herein may be implemented with any desired number of input ports 114 and/or modulator lines 115 and/or with any desired number of optical signal source and modulator pairs 107, each of which may be coupled with one or more modulator line 115.

The PIC 104 may be mounted on the heat sink 106 which may be implemented as any desired device configured to remove thermal energy or control the temperature of the PIC 104, for example a thermo-electric cooler. An optional base plate (not shown) may be implemented to support the PIC 104 as will be appreciated by persons of ordinary skill in the art. The base plate may support the PIC 104 and the modulator driver 102 so that the interconnect bridge assembly 100 may be coupled with the PIC 104 and the modulator driver 102, for example.

The interconnect bridge assembly 100 may be implemented as a multi-layer circuit board and may have a substrate 116 including a bottom side 118 and a top side 120, a first end 122 connected to the modulator driver 102, and a second end 124 connected to the PIC 104. At least one impedance-controlled transmission structure 126 may be formed in the substrate 116, and may be electrically coupled with the modulator driver 102 and the PIC 104 via one or more flip-chip bumps 128a-n as will be described below. As will be appreciated by persons of ordinary skill in the art, the substrate 116 may include any desired number of layers and may include at least one ground plane 117 (FIG. 1) formed therein.

In some exemplary embodiments, the substrate 116 of the interconnect bridge assembly 100 may be at least partially constructed of a substantially flexible or resilient material, so that the substrate 116 may flex or bend to compensate for height differences between the modulator driver 102 and the PIC 104, and/or for thermal expansion and contraction of the heat sinks 106 and 108, as will be appreciated by persons of ordinary skill in the art. In some exemplary embodiments, the substrate 116 may be constructed in compliance with IPC-6013 Class 2 standards, as will be appreciated by persons of ordinary skill in the art.

The impedance-controlled transmission structure 126 includes an impedance control section 130 and a transmission section 132.

The impedance control section 130 may be formed in the substrate 116 adjacent to the bottom side 118 and may extend at least partially between the first end 122 and the second end 124 so as to connect at least one output port 112 and at least one input port 114, for example. The impedance control section 130 may be electrically coupled with the output ports 112 of the modulator driver 102, such as via one or more flip-chip bump 128a, or in any other desired manner, for example.

Further, the impedance control section 130 may be electrically coupled with the at least one input port 114 of the PIC 104 via at least one flip-chip bump 128b, or in any other desired manner, so that an impedance-matched electrical signal may be carried by the impedance control section 130 from the modulator driver 102 to the modulator lines 115a and 115b of the PIC 104, for example.

In the exemplary embodiment shown in FIGS. 1-3, the impedance control section 130 is shown as including a signal line 131a and a signal line 131b separated from one another by a non-conductive gap 133 (e.g., an air gap or a gap filled with a non-conductive material). The signal lines 131a and 131b may be implemented as stepped transmission lines, such as by including conductors formed of any electrically conductive material such as gold, copper, or silver, for example. However, in some exemplary embodiments the impedance control section 130 may include any desired number of signal lines 131, as will be appreciated by persons of ordinary skill in the art. The signal line 131a is may be electrically coupled with the modulator line 115a and the second signal line 131b ma be electrically coupled with the modulator line 115b, for example.

The impedance control section 130 may be configured as an impedance matching circuit which provides optimal signal transformation from the modulator driver 102 to the optical signal source and modulator pair 107 (e.g., where the optical signal source and modulator pair 107 has an impedance different from the impedance of the modulator driver 102), for example, by maximizing the power transfer and/or minimizing reflections from the load in the signal lines 131a and 131b. The impedance control section 130 may be configured as a passive impedance matching circuit using passive impedance, such as stepped transmission lines (e.g., the signal lines 131a and 131b), and/or the impedance control section 130 may use active impedance matching circuit, such as an active transformer (not shown).

The transmission section 132 may be formed in the substrate 116 adjacent to the top side 120, and may have a first end 134 and a second end 136. The first end 134 of the transmission section 132 may be electrically coupled with the modulator lines 115a and 115b via at least one plated via 138 formed in the substrate 116 and via one or more flip-chip bump 128c, for example. The transmission section 132 is shown as including a first signal line 135a electrically coupled with the modulator line 115a and a second signal line 135b electrically coupled with the modulator line 115b by using the plated vias 138. The first and second signal lines 135a and 135b may be implemented similarly to the signal lines 131a and 131b, for example, and are separated from one another by at least one non-conductive gap 133. It is to be understood that in some exemplary embodiments, the transmission section 132 may include any desired number of signal lines 135a and 135b.

As will be appreciated by persons of ordinary skill in the art having the benefit of the instant disclosure, the number, layout, thickness, material, conductivity, and any other physical parameters of the signal lines 131a and 131b and 135a and 135b, and the non-conductive gaps 133 may vary according to the specific electrical signal frequencies, impedance profiles, and other similar parameters of the interconnect bridge assembly 100. Specialized computer software may be used to determine the optimal electrical and/or physical parameters for an interconnect bridge assembly 100 according to some exemplary embodiments of the inventive concepts disclosed herein.

The first signal line 135a and the second signal line 135b of the transmission section 132 may be positioned adjacent to the first end 122 of the substrate 116 and may be electrically coupled with termination resistors 140a and 140b respectively. For example, the termination resistors 140a and 140b may be implemented as a thin film termination resistors positioned between the interconnect bridge assembly 100 and the modulator driver 102, in which case the first signal line 135a may be electrically coupled with the termination resistor 140a via a plated via 142a formed in the substrate 116 and via a flip-chip bump 128d. Further, the second signal line 135b may be electrically coupled with the termination resistor 140b via a plated via 142b and via a flip-chip bump 128d. The termination resistors 140a and 140b may be thermally coupled with the heat sink 108 either directly, or indirectly through the modulator driver 102, as will be appreciated by persons of ordinary skill in the art. It is to be understood that in some exemplary embodiments, the termination resistors 140a and 140b may be associated with the interconnect bridge assembly 100 as will be described below with reference to FIGS. 4-5. Further, it is to be understood that in some exemplary embodiments both the signal line 135a and 135b may be coupled with the same termination resistor 140.

The flip-chip bumps 128a-n may be implemented as bumps or droplets of conductive material, such as gold or copper, for example, that can be soldered or otherwise electrically coupled with the output ports 112a and 112b of the modulator driver 102, with the input ports 114a and 114b of the PIC 104, and/or with the impedance-controlled transmission structure 126. Further, as will be appreciated by persons of ordinary skill in the art, in some exemplary embodiments the flip-chip bumps 128a-n may be omitted and the interconnect bridge assembly 100 may be electrically coupled with the modulator driver 102 and the PIC 104 in any desired manner, such as by electrically coupling the impedance-controlled transmission structure 126 with the output ports 112a and 112b and the input ports 114a and 114b, for example. In some exemplary embodiments, the flip-chip bumps 128a-n may also physically support or otherwise associate the interconnect bridge assembly 100 with the modulator driver 102 and/or with the PIC 104, while in some exemplary embodiments any desired support structure may be implemented with the interconnect bridge assembly 100.

As will be appreciated by persons of ordinary skill in the art, the transmission section 132 and the impedance control section 130 of the impedance-controlled transmission structure 126 cooperate with one another and with the modulator driver 102 and the PIC 104, so that the output ports 112a and 112b of the modulator driver 102 and the termination resistors 140a and 140b are electrically coupled with one another. For example, an impedance-matched differential electrical signal may be transmitted to the input ports 114a and 114b and the modulator lines 115a and 115b via the signal lines 131a and 131b of the impedance control section 130. The impedance-matched differential electrical signal may be transmitted to the transmission section 132 via the modulator lines 115a and 115b. Finally, the differential electrical signal may be transmitted to the termination resistors 140a and 140b by the signal lines 135a and 135b of the transmission section 132.

In operation, an interconnect bridge assembly 100 according to the inventive concepts disclosed herein may be used to efficiently carry impedance-matched high-frequency differential electrical signals between a modulator driver, such as the modulator driver 102, and a modulator implementer as a PIC, such as the PIC 102 as follows.

A high-frequency differential electrical signal indicative of data to be transmitted by the DWDM system 80 may be transmitted to the output ports 112a and 112b of the modulator driver 102 via the signal transmission lines 110a and 110*b* respectively. From there, the differential electrical signal may be transmitted to the input ports 114*a* and 114*b* of the PIC 104 via the signal liners 131*a* and 131*b* respectively of the impedance control section 130 in an impedance-matched manner. The impedance control section 130 may be configured as an impedance matching circuit which is configured to provide optimal signal transformation from the modulator driver 102 to the optical signal source and modulator pair 107 by matching the first impedance of the modulator driver 102 and the second impedance of the optical signal source and modulator pair 107, for example.

The impedance-matched differential electrical signal may be further transmitted through the modulator lines 115*a* and 115*b* and may be used by the optical signal source and modulator pair 107 to encode an optical signal with data carried by the differential electrical signal as will be appreciated by persons of ordinary skill in the art. The optical signal may be transmitted onto an optical network, such as the optical fiber 109 of the DWDM system 80, for example. In order to control the impedance that may result from the high frequency of the differential electrical signal, the differential electrical signal may further be transmitted to the transmission section 132 by the modulator lines 115*a* and 115*b* using the plated vias 138*a* and 138*b* and the signal lines 135*a* and 135*b* respectively. The differential electrical signal may then be transmitted to the termination resistors 140*a* and 140*b* by the signal lines 135*a* and 135*b* using the plated vias 142*a* and 142*b*, for example. As will be appreciated by person of ordinary skill in the art, the termination resistors 140*a* and 140*b* may absorb at least a portion of the differential electrical signal and may convert the differential electrical signal into thermal energy or heat, which may be communicated to the heat sink 108. Advantageously, the heat generated by the termination resistors 140*a* and 140*b* is moved away from the PIC 104 so that the operation of the PIC 104 is not affected by such heat. Any heat generated at the PIC 104 may likewise be absorbed by the heat sink 106, for example.

It is to be understood that while the interconnect bridge assembly 100 is shown as described as having one impedance control structure 126, any desired number of impedance-controlled structures 126 may be implemented with the interconnect bridge assembly 100, such as a single impedance-controlled structure 126, two impedance-controlled structures 126, three impedance-controlled structures 126, more than four impedance-controlled structures 126, and/or a plurality of impedance-controlled structures 126, for example, as will be appreciated by a person of ordinary skill in the art.

Further, while the electrical signal transmitted by the interconnect bridge assembly 100 between the modulator driver 102 and the PIC 104 is described as a differential electrical signal, interconnect bridge assemblies according to the inventive concepts disclosed herein may be used to transmit any desired electrical signal or electrical signals indicative of data between a modulator driver, such as the modulator driver 102 and a modulator incorporated in a PIC, such as the PIC 104, for example.

Figure 4:
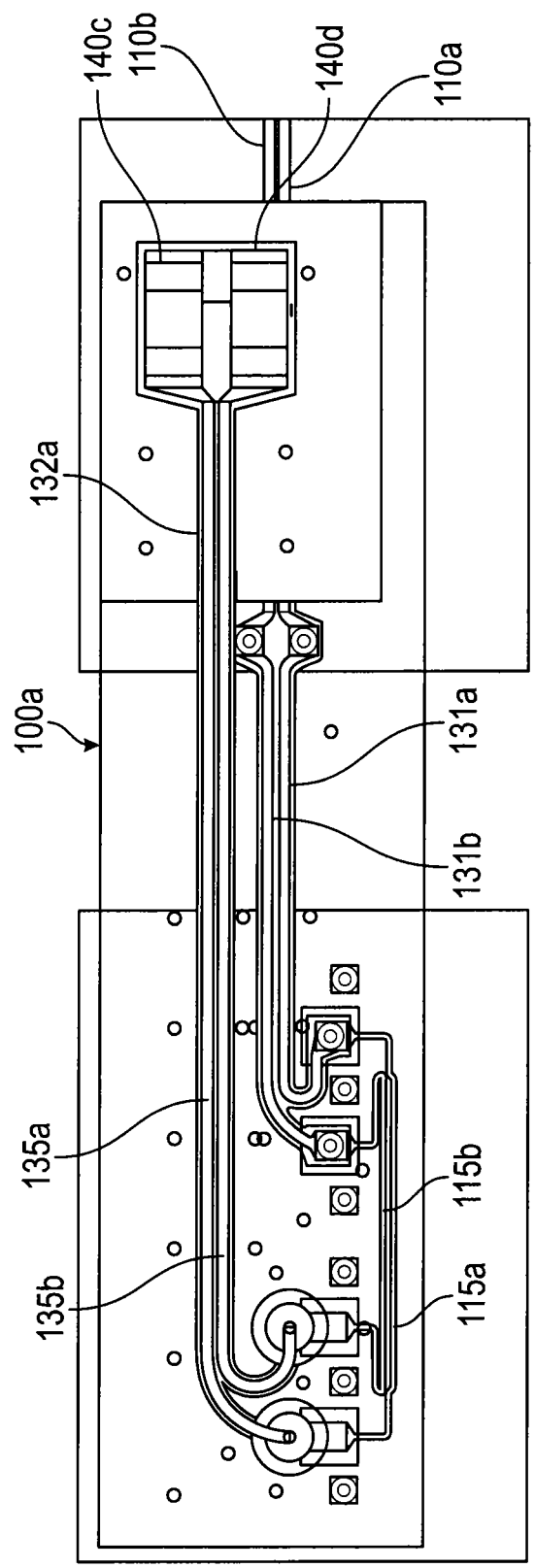
FIG. 4 is a top-view diagram of an exemplary embodiment of an interconnect bridge assembly according to the inventive concepts disclosed herein.
Figure 5:
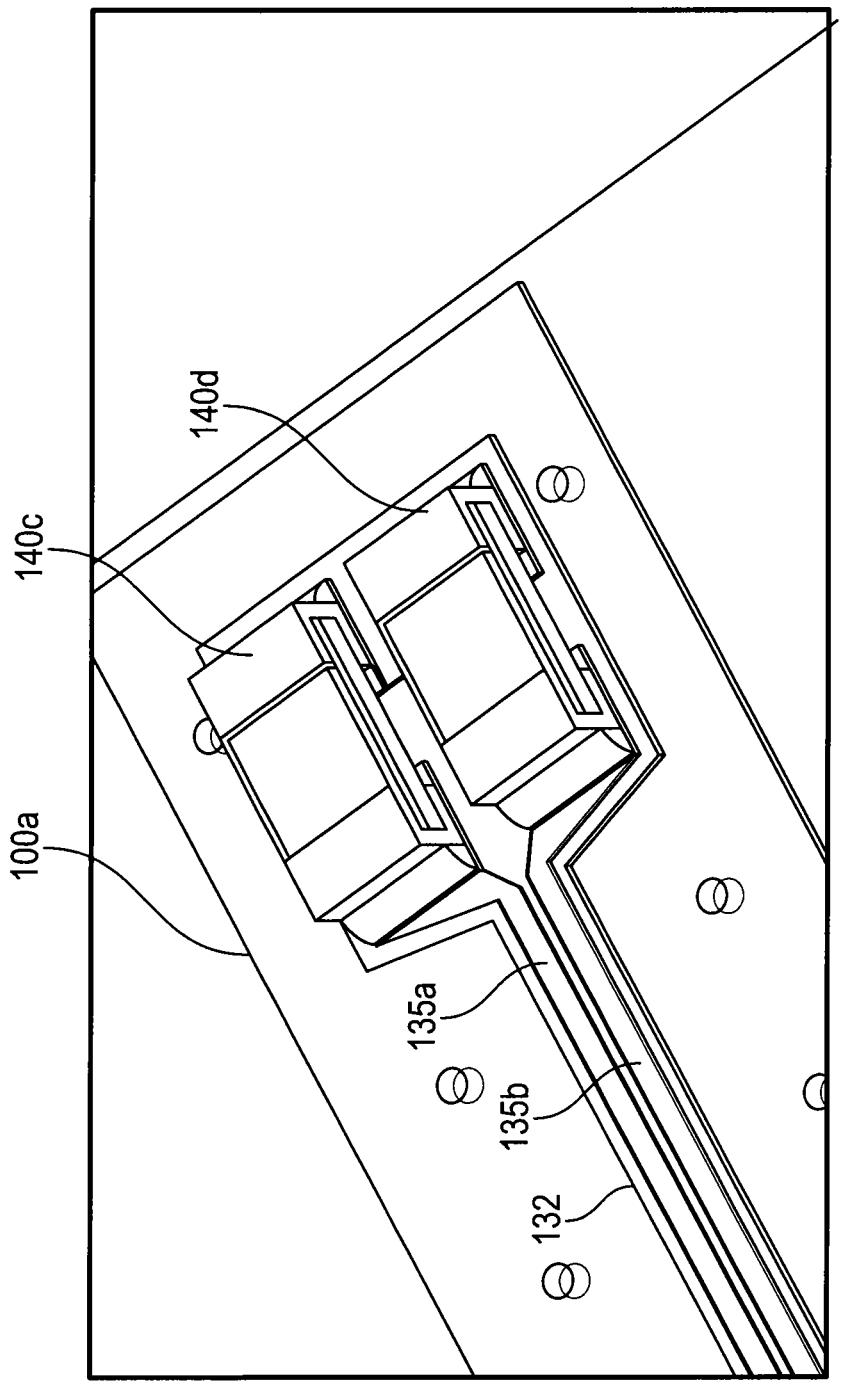
FIG. 5 is an enlarged view of the interconnect bridge assembly of FIG. 4.
Figure 6:
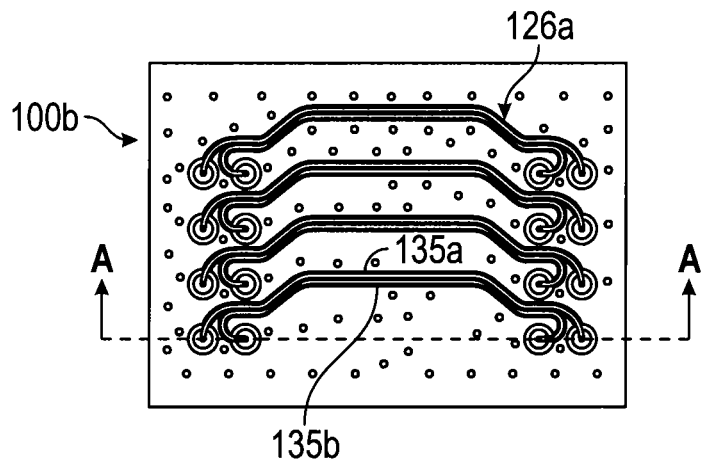
FIG. 6 is a top plan view of an exemplary embodiment of an interconnect bridge assembly according to the inventive concepts disclosed herein.
Figure 7:
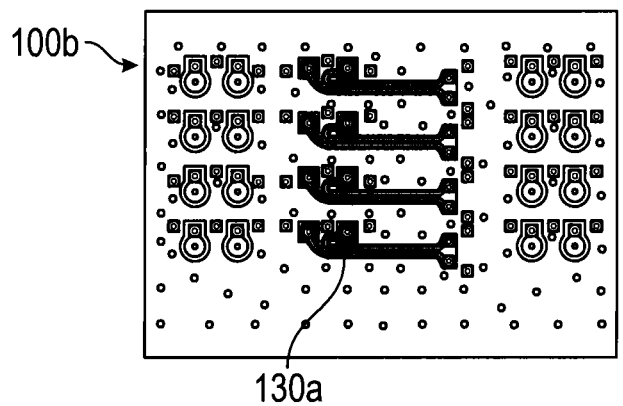
FIG. 7 is a bottom plan view of the interconnect bridge assembly of FIG. 6.

Referring now to FIGS. 4-5, an exemplary embodiment of an interconnect bridge assembly 100*a* according to the inventive concepts disclosed herein may be implemented and may function substantially similarly to the interconnect bridge assembly 100, for example, except that termination resistors 140*c* and 140*d* are shown associated with a top side 120*a* of the interconnect bridge assembly 100*a*, and electrically coupled with the signal lines 135*a* and 135*b* of a transmission section 132*a* of the interconnect bridge assembly 100*a*.

The termination resistors 140*c* and 140*d* may be implemented as +50Ω+50Ω back to back discrete termination resistors that may have a rating of about 31 mW in some exemplary embodiments. As described above, the termination resistors 140*c* and 140*d* may be thermally coupled with a heat sink, such as the heat sink 108, for example.

Referring now to FIGS. 6-9F, shown therein is an exemplary embodiment of an interconnect bridge assembly 100*b* according to the inventive concepts disclosed herein. The interconnect bridge assembly 100*b* may be implemented and may function substantially similarly to the interconnect bridge assembly 100, and may include four transmission structures 126*a* formed therein, for example. The transmission structures 126*a* may include impedance control sections 130*a* and transmission sections 132*a*, for example. One or more flip-chip bumps 128*a-n* may be implemented to connect the interconnect bridge assembly 100*b* with a modulator driver such as the modulator driver 102 and a PIC, such as the PIC 104, as described above.

The interconnect bridge assembly 100*b* may be constructed by bonding, or otherwise associating any desired number of layers of a stack with one another as will be appreciated by persons of ordinary skill in the art. For example, as shown in FIGS. 9A-9F, in one embodiment six layers may be associated with one another to construct the substrate 116*b* of the interconnect bridge assembly 100*b*. In some exemplary embodiments, the substrate may have a total thickness of 0.22 mm.

A bottom cover layer 150 may be constructed of any desired material with the proper electrical and mechanical properties, for instance polyimide, and may include one or more contact pads 152 formed therein or otherwise associated therewith, so that at least a portion of the contact pads 152 is positioned on an external surface of the bottom cover 150 as will be appreciated by persons of ordinary skill in the art. The bottom cover layer 150 may have a thickness of about 0.025 mm, for example. The contact pads 152 may be constructed of any desired electrically conductive material, such as copper or gold, for example. The contact pads 152 may be positioned, sized, and oriented such that electrical connections with the interior layers of the interconnect bridge assembly 100*b* may be formed as desired. The layout and size of the contact pads 152 may be varied with different frequencies used with the interconnect bridge assembly 100*b*, and to match the input and output ports of modulator drivers and PICs, for example.

A first conductive layer 154 may be constructed of a conductive material such as a metal, for example, and may have signal lines 131*a* and 131*b* separated by non-conductive gaps 133 formed therein, for example. The signal lines 131*a* and 131*b* may be constructed of any desired conductive material such as gold, copper, or silver, for example. The signal lines 131*a* and 131*b* may be positioned so that the signal lines 131*a* and 131*b* are electrically coupled with one or more contact pads 152, for example, when the first conductive layer is stacked onto the bottom cover layer 150. In some exemplary embodiments, the differential impedance of the signal lines 131*a* and 131*b* may be about 34 Ohms, or may vary between about 31 Ohms and 37 Ohms. As will be appreciated by persons of ordinary skill in the art the differential impedance of the signal lines 131*a* and 131*b* may be varied according to the expected frequencies of the electrical signals that are to be carried by the signal lines 131*a* and 131*b*, for example. The first conductive layer 154 may have a thickness of about 12 microns. Further, the substrate 116*b* may have a length of about 4.5 mm and a width of about 3.25 mm in some exemplary embodiments.

Figure 8:
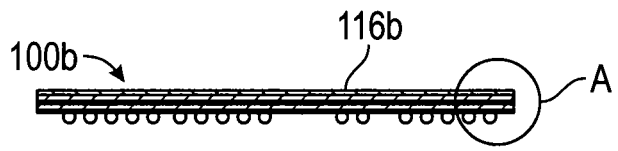
FIG. 8 is a cross-sectional view of the interconnect bridge assembly of FIG. 6.
Figure 8A:
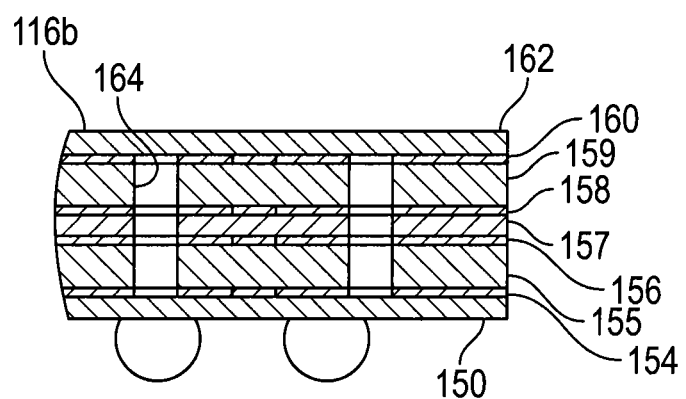
FIG. 8A is a detailed view taken along line A of FIG. 8.
Figure 9A:
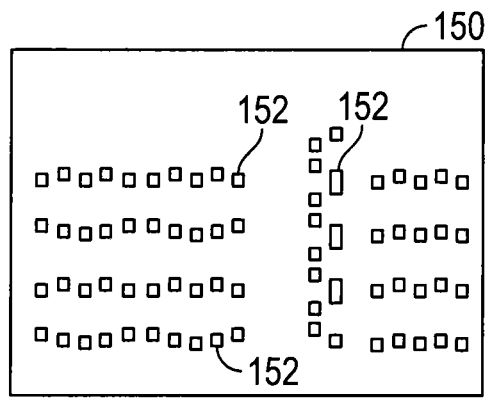
FIGS. 9A-9F are top plan diagrams of the layers of the interconnect bridge assembly of FIG. 6.
Figure 9B:
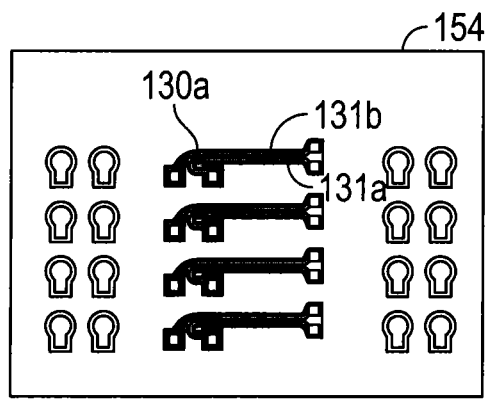
Figure 9C:
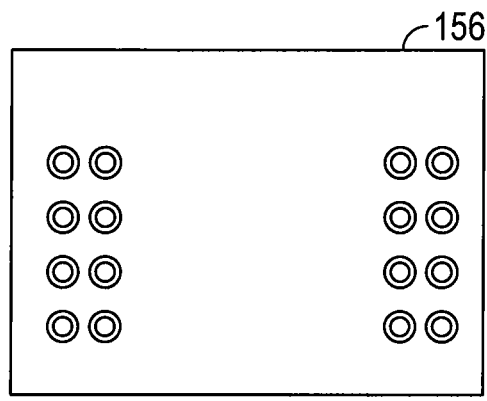
Figure 9D:
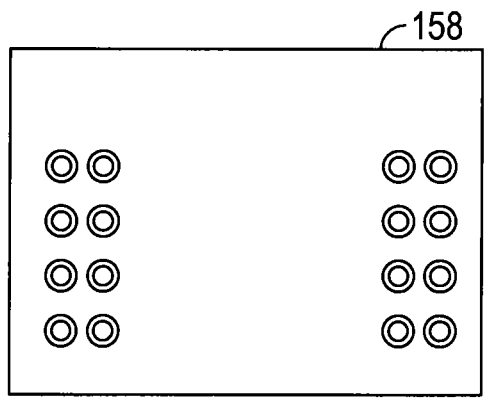
Figure 9E:
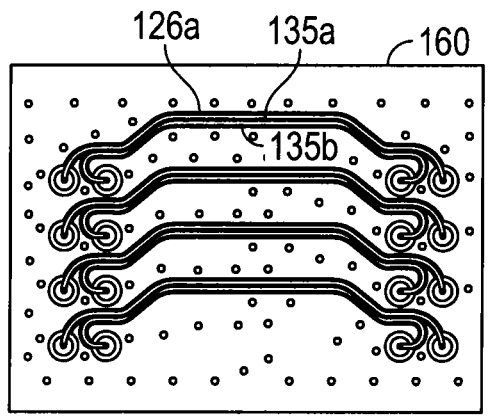
Figure 9F:
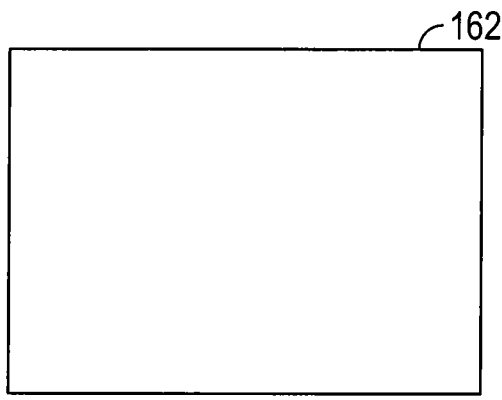

A first bonding layer 155 (FIG. 8A) may be implemented between the first conductive layer 154 and a second conductive layer 156, as will be appreciated by a person of ordinary skill in the art. The first bonding layer 155 may be implemented as a polyamide layer having a thickness of about 0.05 mm, for example.

The second conductive layer 156 may be constructed of a conductive material (e.g., metals such as gold, copper, or silver), and may be configured to function as a ground plane as will be appreciated by a person of ordinary skill in the art. One or more openings (not referenced) may be formed in the second conductive layer and may be shaped and oriented so that one or more plated vias formed in the substrate are electrically insulated from the second conductive layer 156, for example. The second conductive layer may be implemented and may function similarly to the first conductive layer 154, for example, and may have a thickness of about 12 microns, for example.

A second bonding layer 157 (FIG. 8A) may be implemented between the second conductive layer and a third conductive layer 158, for example. The second bonding layer 157 may be implemented similarly to the first bonding layer 155, for example.

The third conductive layer 158 may be constructed of a conductive material, such as a metal, and may be configured to function as a ground plane as will be appreciated by a person of ordinary skill in the art. In some exemplary embodiments of the inventive concepts disclosed herein, the third conductive layer 158 may be implemented substantially similarly to the second conductive layer 156. One or more openings (not referenced) may be formed in the third conductive layer 158 and may be shaped and oriented so that one or more plated vias formed in the substrate are electrically insulated from the third conductive layer 158, for example.

A third bonding layer 159 (FIG. 8A) may be implemented between the third conductive layer 158 and a fourth conductive layer 160. The third bonding layer 159 may be implemented substantially similarly to the second bonding layer 157, for example.

The fourth conductive layer 160 may be constructed of a conductive material such as a metal, and may include the signal lines 133*a* and 133*b* separated by non-conductive gaps 133 as described above. The signal lines 133*a* and 133*b* may be positioned so that the signal lines 133*a* and 133*b* may be coupled with the contact pads 152 by one or more plated vias 164 as will be described below. The signal lines 133*a* and 133*b* may be implemented and may function similarly to the signal lines 131*a* and 131*b*, for example.

Finally, a top cover layer 162 may be implemented substantially similarly to the bottom cover layer 150, except that the contact pads 152 may be omitted.

One or more vias 164 may be formed through the layers of the substrate except the bottom cover layer 150 and the top cover layer 162 of the interconnect bridge assembly 100*b* in any desired manner, and may be plated to electrically couple the various conductive layers (except for the second conductive layer 156 and the third conductive layer 158). The vias 164 may be plated with a conductive material such as gold or copper to a thickness of about 13 microns, for example. The vias 164 may also electrically couple the signal lines 131*a* and 131*b* and the contact pads 152. The vias 164 may likewise electrically couple the signal lines 133*a* and 133*b* with the contact pads 152, as will be appreciated by a person of ordinary skill in the art.

As will be appreciated by persons of ordinary skill in the art, the interconnect bridge assembly 100*b* may be configured so that the contact pads 152, the signal lines 131*a* and 131*b*, and 133*a* and 133*b* cooperate with one another to form the impedance-controlled structures 126*a*, and so that the interconnect bridge assembly 100*b* is configured to connect a modulator driver (e.g., the modulator driver 102) and a PIC (e.g., the PIC 104), as described above.

Further, as will be appreciated be persons of ordinary skill in the art, the above dimensions, sized, reflectance impedances, and other exemplary properties of the substrate 116*b* are implemented for a particular frequency of electrical signals to be transmitted by the interconnect bridge assembly 100*b*. Any and all of these properties may be varied to match a frequency of the electrical signals transmitted by the interconnect bridge assembly 100*b*, such as by selecting one or more of the properties via a computer software program, for example.

It is to be understood that any desired number of impedance-controlled structures 126*a* may be implemented with the interconnect bridge assembly 100*b*, such as a single impedance-controlled structure 126*a*, two impedance-controlled structures 126*a*, three impedance-controlled structures 126*a*, more than four impedance-controlled structures 126*a*, and/or a plurality of impedance-controlled structures 126*a*, for example.

Figure 10:
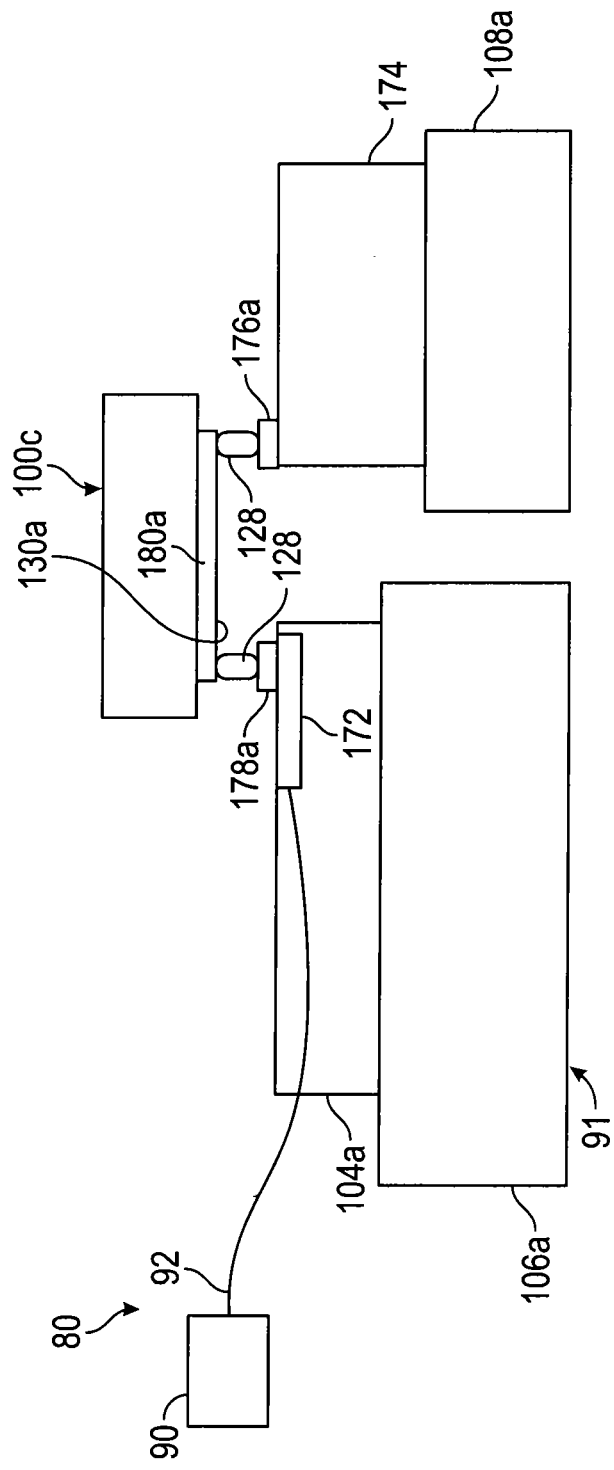
FIG. 10 is a diagram of an exemplary embodiment of an interconnect bridge assembly according to the inventive concepts disclosed herein shown connected to an optical signal detector implemented as a receiver photonic integrated circuit and to a receiver amplifier which receives electrical signals from the photonic integrated circuit via the interconnect bridge assembly.

Referring now to FIG. 10 shown therein is an exemplary embodiment of a photonic receiver 91 having an interconnect bridge assembly 100*c* according to the inventive concepts disclosed herein shown connected to an optical signal detector 170 incorporated in a receiver PIC 104*a* and to a receiver amplifier 174. As discussed above, the photonic receiver 91 may be a part of a DWDM optical network module (not shown) as will be appreciated by a person of ordinary skill in the art having the benefit of the instant disclosure.

The receiver amplifier 174 may be implemented as any desired integrated circuit device, such as a processor, a field-programmable gate array, an application specific integrated circuit, or combinations thereof, and may be configured to receive one or more electrical signals from the optical signal detector 172 and to amplify, filter, or otherwise process the one or more electrical signals. The receiver amplifier 174 may have a third impedance. In some exemplary embodiments, the receiver amplifier 174 may include two or more input ports 176*a* and 176*b*, for example. The receiver amplifier 174 may be thermally coupled with a heat sink 108*a* configured to absorb and/or remove thermal energy from the receiver amplifier 174, as will be appreciated by persons of ordinary skill in the art. The heat sink 108*a* may be implemented and may function similarly to the heat sink 108 in some exemplary embodiments.

The PIC 104*a* may be implemented as a photonic integrated circuit configured to convert one or more wave-division multiplexed optical signals received from the photonic transmitter 90 via the fiber optic link 92 into one or more electrical signals, and to transmit the electrical signals to the receiver amplifier 174. The PIC 104*a* may include an array waveguide and one or more optical signal demultiplexers (not shown) and the at least one optical signal detector 172 having a fourth impedance which may be different from the third impedance of the receiver amplifier 174. The optical signal detector 172 may be configured to detect at least one optical signal and to generate and electrical signal indicative of the detected optical signal. The PIC 104*a* may include two or more output ports 178*a* and 178*b* electrically coupled with the optical signal detector 172, for example.

The wave-division demultiplexer(s) of the PIC 104*a* may be optically coupled with the fiber optic link 92 via one or more optical interconnects (not shown), so as to receive a wave division multiplexed optical signal from the fiber optic link 92, for example. In some exemplary embodiments, the PIC 104a may be implemented and function similarly to the photonic circuit integrated circuit chips described in U.S. Pat. No. 8,300,994.

It is to be understood that while the exemplary embodiment shown in FIG. 10 includes a first output port 178a and a second output port 178b, exemplary embodiments of the inventive concepts disclosed herein may be implemented with any desired number of output ports 178 and/or with any desired number of optical signal detectors 172, each of which may be coupled with two or more output ports 178.

The PIC 104a may be mounted on a heat sink 106a which may be implemented and may function similarly to the heat sink 106, for example. An optional base plate (not shown) may be implemented to support the PIC 104a as will be appreciated by persons of ordinary skill in the art. The base plate may support the PIC 104a and the receiver amplifier 174 so that the interconnect bridge assembly 100c may be coupled with the PIC 104a and the receiver amplifier 174, for example.

The interconnect bridge assembly 100c may be implemented similarly to the interconnect bridge assembly 100 and may include an impedance control section 130a having a first and second signal lines 180a and 180b electrically coupled with the output ports 178a and 178b and with the input ports 176a and 176b, such as via four or more flip-chip bumps 128, for example. The first and second signal lines 180a and 180b may be electrically insulated from one another and may be separated from one another via non-conductive gaps 182, for example. The impedance control section 130a may be implemented and may function substantially similarly to the impedance control section 130 as will be appreciated by persons of ordinary skill in the art so as to provide impedance matching between the optical signal detector 172 and the receiver amplifier 174, for example. The signal lines 180a and 180b may be implemented and may function similarly to the signal lines 131a and 131b, for example.

In operation, an optical signal, such as a dense wave division multiplexed optical signal indicative of data may be received by the PIC 104a via the fiber optic link 92. The optical signal may be demultiplexed and provided to the at least one optical signal detector 172, for example. The optical signal detector 172 may detect at least a portion of the optical signal and may generate a differential electrical signal indicative of information encoded in the optical signal. The differential electrical signal may be transmitted through the signal lines 180a and 180b of the interconnect bridge assembly 100c via the flip-chip bumps 128 coupling the impedance control section 130a of the interconnect bridge assembly 100c with the output ports 178a and 178b of the PIC 104a, for example. From there, the impedance matched differential electrical signal may be transmitted to the receiver amplifier 174 via the signal lines 180a and 180b and the input ports 176a and 176b in an impedance-controlled manner as described above, for example.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A photonic transmitter, comprising:
   a modulator driver having a first output port and a second output port, the modulator driver being an integrated circuit;
   a photonic integrated transmitter circuit having at least one modulator having a first input line and a second input line, a first input port electrically coupled with the first input line and a second input port electrically coupled with the second input line;
   an interconnect bridge assembly, including:
      a first termination resistor;
      a second termination resistor;
      a substrate;
      at least one impedance-controlled transmission structure formed in the substrate, the at least one impedance-controlled transmission structure having:
         an impedance control section including a first signal line electrically coupled with the first output port of the modulator driver and with the first input port of the photonic integrated transmitter circuit, and a second signal line electrically coupled with the second output port of the modulator driver and with the second input port of the photonic integrated transmitter circuit, the first and second signal lines being electrically insulated from one another;
         a transmission section including a third signal line electrically coupled with the first input line of the at least one modulator and with the first termination resistor, and a fourth signal line electrically coupled with the second input line of the at least one modulator and with the second termination resistor; and
   wherein the interconnect bridge assembly is configured to transmit an impedance-matched differential electrical signal provided by the integrated circuit to the modulator, and to transmit the differential electrical signal from the at least one modulator to the first and second termination resistors, the first and second termination resistors being provided on the integrated circuit.

2. The photonic transmitter of claim 1, wherein the first and second termination resistors are thin-film resistors associated with the modulator driver.

3. The photonic transmitter of claim 1, wherein the first and second termination resistors are discrete resistors associated with the modulator driver.

4. The photonic transmitter of claim 2, wherein the first and second termination resistors are thermally coupled with a heat sink.

5. The photonic transmitter of claim 1, wherein the photonic integrated transmitter circuit is thermally coupled with a heat sink.

6. The photonic transmitter of claim 1, wherein the substrate is substantially flexible.

7. The photonic transmitter of claim 1, wherein the interconnect bridge assembly is electrically coupled with the first and second output ports of the modulator driver and with the first and second input ports of the photonic integrated transmitter circuit by being flip-chip bonded thereto via at least four flip-chip bumps.

8. The photonic transmitter of claim 1, wherein the impedance control section is a passive impedance-matching circuit.

9. The photonic transmitter of claim 8, wherein the first and second signal lines are stepped transmission lines.

10. The photonic transmitter of claim 1, wherein the impedance control section includes an active impedance-matching circuit.

11. The photonic transmitter in accordance with claim 4, wherein the integrated circuit is thermally coupled to the heat sink.

12. The photonic transmitter in accordance with claim 11, wherein the heat sink is a first heat sink, the photonic integrated transmitter being provided on a second heat sink.

13. The photonic transmitter in accordance with claim 1, wherein the interconnect bridge assembly includes a ground plane.

14. The photonic transmitter in accordance with claim 1, wherein the first and second signal lines are provided on a bottom side of the substrate.

15. The photonic transmitter in accordance with claim 14, wherein the third and fourth signal lines are provided on a top side of the substrate.

16. The photonic transmitter in accordance with claim 15, wherein the top side is opposite the bottom side.

* * * * *